US012667113B2

(12) United States Patent
Lavrijsen et al.

(10) Patent No.: US 12,667,113 B2
(45) Date of Patent: Jun. 30, 2026

(54) METHOD OF REMOVING SPORES FROM RAW GOAT MILK, PROCESS FOR PREPARING PURIFIED GOAT MILK, GOAT MILK ACCORDINGLY PRODUCED AND ITS USE AND CHEESE MAKING METHOD

(71) Applicant: DAIRY PROTEIN COOPERATION FOOD B.V., Bodegraven (NL)

(72) Inventors: Bas Willem Maarten Lavrijsen, Bodegraven (NL); Frédéric Benjamins, Bodegraven (NL)

(73) Assignee: DAIRY PROTEIN COOPERATION FOOD B.V., Bodegraven (NL)

( * ) Notice: Subject to any disclaimer, the term of this patent is extended or adjusted under 35 U.S.C. 154(b) by 1109 days.

(21) Appl. No.: 17/609,490

(22) PCT Filed: May 8, 2020

(86) PCT No.: PCT/NL2020/050297
§ 371 (c)(1),
(2) Date: Nov. 8, 2021

(87) PCT Pub. No.: WO2020/226501
PCT Pub. Date: Nov. 12, 2020

(65) Prior Publication Data
US 2022/0232842 A1    Jul. 28, 2022

(30) Foreign Application Priority Data
May 8, 2019    (EP) ..................................... 19173314

(51) Int. Cl.
*A23C 7/04* (2006.01)
*A01J 11/10* (2006.01)
(Continued)

(52) U.S. Cl.
CPC ............... *A23C 7/046* (2013.01); *A01J 11/10* (2013.01); *A23C 9/1422* (2013.01); *A23C 19/05* (2013.01); *A23C 2210/256* (2013.01)

(58) Field of Classification Search
CPC ....... A23C 7/046; A23C 9/1422; A23C 19/05; A01J 11/10
See application file for complete search history.

(56) References Cited

U.S. PATENT DOCUMENTS

2012/0301591 A1    11/2012    Fauquant et al.
2014/0308417 A1    10/2014    Adachi

FOREIGN PATENT DOCUMENTS

EP    1 825 759 A1    8/2007
FR    2 660 527 A2    10/1991
(Continued)

OTHER PUBLICATIONS

HammockHavenFarm, "How to Separate Cream from Goat Milk—Using a Cream Separator", Jul. 12, 2018 (Jul. 12, 2018), p. 1, Retrieved from the Internet:URL:https://www.youtube.com/watch?v=thDWRmr0FR8XP054980745; retrieved on Aug. 4, 2020. 2 Pages.

(Continued)

*Primary Examiner* — Katherine D Leblanc
(74) *Attorney, Agent, or Firm* — Leason Ellis LLP

(57) ABSTRACT

Disclosed is method of removing spores from raw goat milk. Thereby raw goat milk is subjected to decreaming in a separator. Goat cream is thereupon subjected to mild heat treatment. Goat skim milk may be subjected to microfiltration. Retentate therefrom is subjected to sterilization. The process results in a goat milk that is low in bacteria and spores. Disclosed is a non-sterilized milk, the use of said (Continued)

milk in cheese production, a method of making cheese and the use of the purified goat milk for obtaining whey and casein.

15 Claims, 3 Drawing Sheets

(51) Int. Cl.
   *A23C 9/142*        (2006.01)
   *A23C 19/05*        (2006.01)

(56)                References Cited

FOREIGN PATENT DOCUMENTS

| FR | 2 808 688 A1 | 11/2001 |
| WO | 9716977 A1 | 5/1997 |

OTHER PUBLICATIONS

International Search Report and Written Opinion for Corresponding International Application No. PCT/NL2020/050297, dated Aug. 26, 2020. 11 Pages.

METHOD OF REMOVING SPORES FROM RAW GOAT MILK, PROCESS FOR PREPARING PURIFIED GOAT MILK, GOAT MILK ACCORDINGLY PRODUCED AND ITS USE AND CHEESE MAKING METHOD

CROSS-REFERENCE TO RELATED PATENT APPLICATIONS

This application is a U.S. National Stage Application under 35 U.S.C. § 371 of International Patent Application No. PCT/NL2020/050297 filed May 8, 2020, which claims the benefit of priority of European Patent Application No. 19173314.6 filed May 8, 2019, both of which are incorporated by reference in their entireties. The International Application was published on Nov. 12, 2020, as International Publication No. WO/2020/226501.

FIELD OF THE INVENTION

The invention disclosed herein relates to a process for the preparation of purified goat milk, particularly goat milk having a reduced content of bacteria and spores. The invention also relates to the purified goat milk so obtained, and to uses thereof in producing purified goat cheese, purified goat milk serum, and/or purified goat casein.

BACKGROUND

Goats produce about 2% of the world's total annual milk supply. An important usage of goat milk is in the production of goat cheese. Further an increasing interest exists in putting to use goat milk components, such as goat milk-derived casein and goat milk whey proteins.

Goat milk essentially deviates from the much more commonly used cow milk. E.g., goat milk naturally has small, well-emulsified fat globules, which means the cream remains suspended in the milk, instead of rising to the top, as in raw cow milk. Traditionally, this has been seen as an advantage, as goat milk does not need to be homogenized. In fact, if the milk is to be used to make cheese, homogenization is not normally recommended, as this changes the structure of the milk, affecting the culture's ability to coagulate the milk and the final quality and yield of cheese.

Goat cheese can be of the semi-hard type (e.g. parallel to Gouda cheese as made from cow milk). This cheese type is sensitive for a defect called "late blowing", due to an undesired growth of *Clostridium tyrobutyricum*. In cow milk, removal of microorganisms such as bacteria and spores, is generally conducted by bactofugation.

Bactofugation is the process of removal of microorganisms from milk using centrifugal force. It is a special form of separation of microorganisms, mainly spore formers (*Bacilli/Clostridia*). Most of the microorganisms are inactivated by pasteurization. However, the highly heat resistant spores survive pasteurization. They can lead to significant quality defects in hard cheese, semi-hard cheese or long-life products due to proteolysis, lipolysis and gas formation. Therefore, bactofugation is mainly used in the manufacture of these products. The objectives of bactofugation are as follows:

To improve bacteriologic quality of milk;
To avoid heat resistant bacteria and spores without resorting to excessive heating;
To ensure exceptionally high degree of purity of the milk.

The microorganisms involved in causing milk spoilage, reducing the quality of powder and butyric fermentation thereby causing late blowing of cheese, are mostly spore formers.

Goat milk is not, however, suitable for bactofugation, e.g., resulting in an immediate clogging of the bactofugation equipment. In some instances, therefore, the late-blowing is prevented by the addition of lysozyme. This additive, however is costly, it will require labelling in some jurisdictions (such as EU), and the remnants of this enzyme will end up in the whey that comes off with cheese making. This hampers the suitability of such whey for regulated markets such as infant formula, in which otherwise the use of goat whey proteins is a desirable option.

Also, the presence of spore formers in goat milk limits the practical applicability of goat milk components.

An additional complication when considering how to remove bacteria and spores from goat milk, is that goat milk, due to its different character from cow milk, is difficult to sterilize. Goat milk is more sensitive to heat and consequently gives a lower heat coagulation time (HCT). During processing this leads to faster fouling of process equipment. Moreover, sterilization of cream has been problematic due to the formation of off-flavour, in particular "cooked flavour" which is undesired. In the processing of cow milk-derived cream high temperature short time (HTST) treatment is generally applied, for instance 4 seconds at 140° C. This provides sufficient reduction of bacteria and limits the formation of off-flavour. Due to the lower temperatures generally applied to goat milk-derived cream, the heating time is longer to achieve the desired reduction of bacteria, e.g. 30 seconds at 125° C. However, due to the different kinetics of off-flavour formation compared to reduction of bacteria, these longer heating times lead to increased off-flavour.

A background reference on the removal of bacteria from milk without requiring a high temperature treatment is US 2014/0308417 A1. The method described herein comprises, in brief, separating milk into a cream fraction and a skim milk fraction, thereby discharging a cream fraction, a skim milk fraction, and a sludge. The skim milk fraction is subjected to microfiltration, thereby obtaining a permeate (microfiltrate) having a reduced bacteria content and a retentate containing the residual bacteria. The teaching of US 2014/0308417 A1 is to then subject said retentate to centrifugal separation. Thereby a clean fraction having a low bacteria content is obtained, and a fraction having a high bacteria content. The method is disclosed as being suitable for any customary type of milk, thereby presenting e.g. milk from cow, goat, or sheep on the same footing. The disclosure does not acknowledge any specific problems incurred with goat milk. In fact, the method as disclosed cannot be suitably used for goat milk, thereby not allowing such adequate removal of bacteria and spores as desired. As said, goat milk does not properly allow bactofugation, The typical problems associated with clogging by e.g. proteins in goat milk as such, are worsened, rather than avoided, if it were attempted with goat milk to subject a more concentrated stream, such as the retentate in US 2014/0308417, to centrifugal separation of bacteria.

It is thus desired to find a process by which goat milk can be purified from bacteria and spores. It is further desired to thereby provide a process that results in goat milk the components of which can be put to better use, and particularly also in situations (infant formula; diet for the elderly) that are normally sensitive to the presence of spores.

In cheese production, additives are added to the milk in order to prevent spores to germinate in the cheese and cause defects like late blowing. The spores however, remain in the whey regardless of the addition of for instance lysozyme.

Until now, it has not been possible to produce goat milk purified from spores, and to remove the limitations for the use of goat milk components in regulated products such as infant formula.

SUMMARY OF THE INVENTION

In order to better address one or more of the foregoing desires, the invention provides, in one aspect, a method of removing spores from raw goat milk, the method comprising subjecting the raw goat milk to decreaming in a cream separator thereby separately removing a heavy fraction comprising bacteria and spores, wherein the method comprises feeding the raw goat milk into the cream separator at a flow rate below the full capacity of the cream separator, thereby allowing for a residence time of the milk exceeding the residence time at full capacity. It will be understood that the decreaming results in removing goat cream, the product obtained being goat skim milk.

In another aspect, the invention presents a process for the preparation of purified goat milk, i.e., having a reduced content of bacteria and spores, the process comprising:

(a) providing raw goat milk;

(b) subjecting the raw goat milk to the aforementioned method of removing spores; the method comprising subjecting the raw goat milk to decreaming in a cream separator, thereby separately removing goat cream and a heavy fraction comprising bacteria and spores, wherein the method comprises feeding the raw goat milk into the cream separator at a flow rate below the full capacity of the cream separator; thereby obtaining goat skim milk and goat cream;

(c) subjecting the goat cream to mild heat treatment so as to obtain treated goat cream;

(d) subjecting the goat skim milk to microfiltration so as to remove bacteria and spores, thus obtaining a goat skim milk microfiltrate and a bacteria- and spores-containing microfiltration retentate;

(e) optionally concentrating the microfiltration retentate by subjecting said retentate, preferably together with the heavy fraction from the cream separator, to further cream separation and microfiltration, thus obtaining a lower volume of microfiltration retentate (f) subjecting the microfiltration retentate of step (d) or (e), optionally together with the heavy fraction from the cream separator, to sterilization so as to obtain a sterilized retentate;

(g) combining the goat skim milk microfiltrate, the sterilized retentate, and the treated goat cream so as to obtain the purified goat milk.

In a further aspect, the invention provides purified goat milk obtainable by a process as described above, resulting in an at least 1 log reduction, preferably an at least 2 log reduction, for both bacteria and spores. Particularly, the invention provides non-sterilized goat milk comprising at most 500 spores/ml, preferably at most 250 spores/ml.

In a still further aspect, the invention provides the use of said purified goat milk, particularly said non-sterilized goat milk comprising at most 500 spores/ml, as a cheese milk in the production of cheese.

In yet another aspect, the invention presents the use of said purified goat milk, particularly said non-sterilized goat milk comprising at most 500 spores/ml, for obtaining whey protein and casein, comprising subjecting the purified goat milk to microfiltration, so as to obtain the whey as a filtrate, and casein as a retentate.

DETAILED DESCRIPTION OF THE INVENTION

Figure 1:
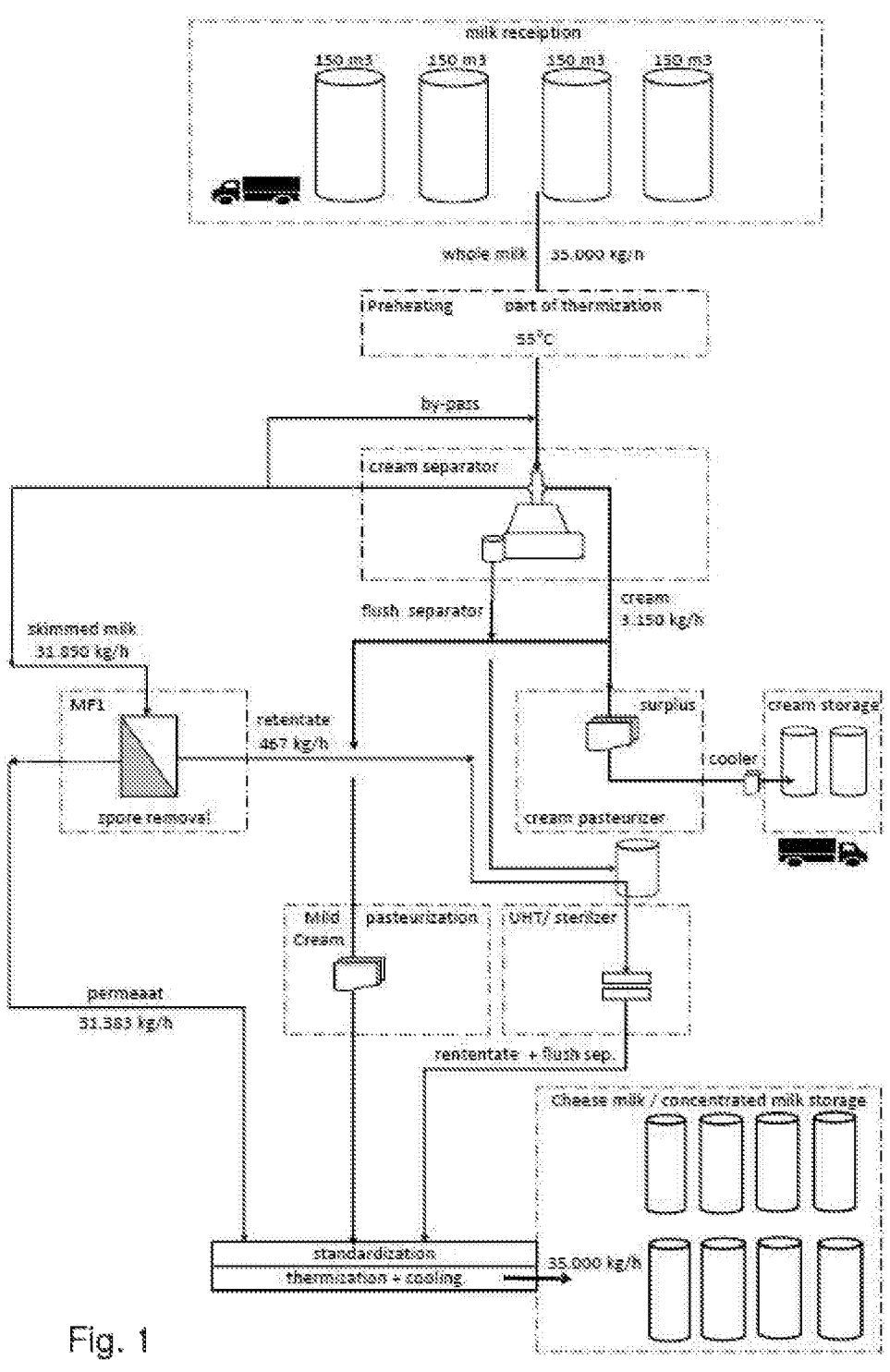
FIGS. 1-3 present schematic representations of processes according to the invention.

The invention involves the removal, against customary practice, of bacteria and spores from raw goat milk. In a broad sense, the invention is based on a judicious set of measures that allows a better removal of spores from raw goat milk. A first measure is to subject raw goat milk to a decreaming process conducted in such a way as to allow for a residence time of the milk in a cream separator that exceeds the residence time at full capacity.

To this end, the method of the invention provides feeding the raw goat milk into the cream separator at a flow rate below the full capacity of the cream separator. It will be understood that the absolute values for flow rate will differ per cream separator. The skilled person, apprised of a specific cream separator, will normally know what the full capacity of such cream separator is. In carrying out the present invention, the skilled person will then be well capable of operating the cream separator such that it is not fed according to full capacity.

In an interesting embodiment, the cream separator is of a type operated as a hermetically closed centrifuge. In that event, the method comprising operating said cream separator at a flow rate below its full capacity. In another interesting embodiment, the cream separator is an open centrifuge. In that event, the method comprises operating said cream separator at a flow rate that exceeds the input flow rate of the raw goat milk. This creates an overflow of centrifuged raw goat milk, whereby the overflow is recirculated to the cream separator.

The foregoing method produces a synergistic effect in relation to the removal of spores (and bacteria). For, the process results in a higher reduction of the number of spores in the cream than in a conventional decreaming process. Further, the resulting skim milk has a lower amount of fat, as a result of which the removal of spores (and bacteria) therefrom, can be conducted more effectively during the following microfiltration. In this respect, preferably, the removal of spores (and bacteria) further involves microfiltration (MF) of goat skim milk. The second measure is in further deviation from microfiltration and bacteria removal as conventionally conducted in cow milk. Thereby the bactofugate obtained with bactofugation is normally combined with the cream, and then subjected to sterilization (typically at temperatures above 125° C.). In the present invention, it is judiciously avoided to combine said retentate with the cream. This avoids a problem, which typically occurs in the event of cream from goat milk, viz. that the proteins in the retentate and the fat in the cream tend to coagulate when put together at sterilization temperatures. Moreover, this measure ensures that the cream can be subjected to a relatively mild temperature treatment. As discussed above, this is an important advantage in view of taste. Also, the method of the invention results in less fouling of process equipment.

The method comprises subjecting the raw goat milk to decreaming in a decreaming centrifuge, also known as a cream separator. Decreaming centrifuges as such belong to the common general knowledge of the dairy processing expert. With the present invention a method has been found that allows a decreaming centrifuge to remove spores specifically from goat milk. To this end, in an open-type cream separator effectively a double centrifuge treatment is conducted, or in a closed-type cream separator a centrifuge treatment is conducted at a longer residence time. This is accomplished by operating the decreaming centrifuge at a flow rate that exceeds the flow rate of raw goat milk as fed to the centrifuge. In other words, the centrifuge is running at a capacity (in volume per unit of time) that exceeds the amount of goat milk (in volume per unit of time) fed into the centrifuge. The excess flow rate will generally be in a range of from 20% to 200%, such as 50% to 150%, preferably 75% to 125%, such as about 100%. Thus, e.g., if an amount of goat milk of 10,000 l/h is taken, this will be fed to a decreaming centrifuge having a capacity of, e.g., 12,000 l/h (20% excess) to 30,000 l/h (200% excess), preferably 15,000 l/h to 25,000 l/h, more preferably around 20,000 l/h (100% excess). By recirculating the excess (i.e., the amount of overflow as compared to the feed amount), the goat milk is effectively decreamed twice. As a result, bacteria, and particularly the heavier spores, can be separated more efficiently.

It will be understood that decreaming in a cream separator involves applying a centrifugal force on the milk. This results in a separation of milk from fractions having lower and higher densities than milk (about 1.03 kg/L). Fat, which is a lighter fraction (having a density of about 0.90 kg/L), is driven upwards. Bacteria (having a density of about 1.07 kg/L) and spores (having a density of about 1.20-1.30 kg/L) are driven downwards. Cream separators generally are equipped such that both the lighter fraction and the heavier fraction can be removed from the milk.

Without wishing to be bound by theory, the inventors believe that the better removal of bacteria and spores from goat milk, can be attributed to two effects. One is that the lower fat content of the goat skim milk, as compared to regularly decreamed milk, results in a more efficient microfiltration. The other is that the process of the invention effectively results in a prolonged residence time of the goat milk in the decreaming centrifuge (e.g., 20% to 100% longer as follows from the above). This allows more time for lighter (fat) and heavier (spores) components to become separated. This results in a lower fat content in the skim milk (as more fat is driven upwards) as well as a lower content of spores in the skim milk or cream (as a greater fraction of spores is removed with the heavy fraction or sludge).

In the event of a closed-type cream separator, the same preferences apply to the excess flow rate. Thereby the excess is defined with reference to the difference between the full capacity of the cream separator and the flow rate at which raw goat milk is fed into it.

Thus, for both types of cream separators, the flow rate at full capacity of the cream separator exceeds the flow rate of feeding raw goat milk into it, by an excess in a range of from 50% to 150%, preferably 75% to 125%. Or, in another illustrative example, taking an excess of 100%, an open system cream separator having a capacity of, e.g., 20 m³/h is operated at a flow rate of 20 m³/h; the cream separator is thereby fed with 10 m³/h raw goat milk, and 10 m³/h recirculated skimmed goat milk. In the event of a closed system cream separator, having the same capacity of 20 m³/h, this is operated, in this illustrative example, with solely the feed of 10 m³/h raw goat milk.

An additional advantage is that also the decreaming itself is improved. This is of specific advantage for goat milk, since fat globules therein are generally smaller than in cow milk, and accordingly harder to separate.

As explained above, the decreaming process of the invention allows to more efficiently remove a heavy fraction comprising bacteria and spores from goat milk. Furthermore, the decreaming also has a function in relation to the further removal of bacteria and spores, which is accomplished by microfiltration, for which the presence of fat is undesired due to clogging of the microfiltration membrane by fat particles.

Microfiltration as such belongs to the common general knowledge of the dairy processing expert. Suitable microfilters (membranes) for the separation of spores and bacteria from goat milk, have a pore size in a range of generally 0.5 µm to 2 µm, preferably 0.8 µm to 1.4 µm, such as 1 µm, 1.2 µm or 1.4 µm.

A further advantage of the aforementioned decreaming process, is that the cream obtained has a non-customary low load of bacteria and spores. This is of importance specifically in view of the general properties of cream obtained from goat milk. It would be desired, in the course of further processing the goat milk to a cheesemaking liquid, to subject the cream to a high temperature treatment. Whereas cream and bactofugate are generally sterilized together for cow milk, this is not well possible, for goat dairy cream to sterilization, as proteins from the MF-retentate combined with the cream from goat milk tend to coagulate at a lower temperature than proteins in cream from cow milk. Separately heating said fractions allows for milder heat treatment of the cream, particularly at a temperature below 115° C., since the load of bacteria and spores is considerably lower resulting from the method of the invention. In fact, the process of the invention makes it possible to conduct an extraordinary mild pasteurization, even at a temperature as low as about 60° C.

The latter can be put to use in the preparation of purified goat milk in accordance with the invention. This refers to goat milk having, against the conventional practice for goat milk, a reduced content of bacteria and spores. The process of the invention follows upon the aforementioned method of removing spores. This method, as said, results in obtaining cream ("goat cream") as well as skim milk ("goat skim milk"). The process comprises subjecting the goat cream to heat treatment so as to obtain treated goat cream. This heat treatment is conducted at a temperature generally in a range of from 60° C. to 115° C., such as 65° C. to 110° C., such as 85° C. to 105° C. As noted above, this temperature can advantageously involve an extraordinary mild pasteurization, e.g. at a temperature of 60° C. to 70° C., preferably 60° to 65° C. The heat treatment is typically conducted for a duration below 2 minutes, preferably below 60 seconds, more preferably below 30 seconds. The milder the heat treatment, the more profitable this is for taste and nutritional value, which both are normally adversely affected by denaturation of proteins.

In conventional cow milk processing, it is customary to subject the whey cream to sterilization together with the fraction of bacteria and spores obtained in the course of the decreaming process (i.e., the aforementioned heavy fraction). Due to the typical properties of goat cream, this is not well possible in the course of processing goat milk. In the process of the invention, a heat-treatment of the heavy fraction together with the cream can be judiciously avoided as follows.

The process further comprises subjecting the goat skim milk to microfiltration so as to remove bacteria and spores. This results in a purified goat skim milk filtrate and a bacteria- and spores-containing retentate. In the process of the invention, the aforementioned heavy fraction can be combined with the microfiltration retentate, and then subjected to sterilization, so as to obtain a sterilized retentate. To avoid a big volume of retentate a VCF (Volume Concentration Factor) of 50 to 100 is used in the microfiltration step. In case of a VCF 100 only 1% of the input volume comes out as retentate (more concentrated than a conventional VCF 20-process).

In the invention, in deviation from conventional processes, the microfiltration retentate (and the heavy fraction from the cream separator), preferably all of it, is stored separately (typically cold, i.e., generally at a temperature ranging from refrigerated (4° C.) to ambient (30° C. or below, such as 15° C. tot 25° C., such as 18° C. to 20° C.). At the end of the process, such retentate (preferably with the heavy fraction from the cream separator) is led back to the cream separator. Therein the remaining fat is removed, and the skimmed retentate also goes back to the microfiltration-unit again. Herewith the volume of retentate is put to a very minimum, so just a small volume of this heat instable product has to be sterilized. The conditions of sterilization are generally between 105° C. and 130° C., preferably between 110° C. and 125° C., more preferably between 110° C. and 120° C. for at least 5 and maximum 60 seconds, thus possibly avoiding heat coagulation.

The process thus results in various separately treated components of the goat milk. These are the purified goat skim milk filtrate, the minimum of sterilized retentate, the sterilized heavy fraction of the cream separator and the mild heat-treated goat cream. These components can be recombined, so as to obtain a purified goat milk.

As noted above. the invention provides purified goat milk obtainable by a process as described in this description. The resulting product can be distinguished with reference to goat milk that is not obtainable by the present process. For any given batch of goat milk, treated so as to purify it from bacteria and spores, this distinction can be assessed with reference to the untreated goat milk. This requires determining the bacteria and spores count of the raw goat milk before treatment, and determining the bacteria and spores content of the treated goat milk. In comparison, the treated goat milk obtainable by the process herein described, results in an at least 1 log reduction, preferably an at least 2 log reduction, for both bacteria and spores. In view of the natural variations between batches of goat milk, the skilled person will understand that such comparison is a proper method of characterizing the product. The tests themselves are known, and do not present any difficulty to the skilled person.

The result is a goat milk that still contains substantially all of its components, including taste, but in which the number of live spores and bacteria has been considerably reduced, by at least 1 log reduction, preferably a 2 log reduction or more, such as an at least 3 log or at least 4 log reduction of spores. For bacteria, an at least 3 log to 5 log reduction can be obtained. As mentioned above, this deviates from the normal practice of goat milk processing. Raw goat milk typically has a spores count of 1500 spores/ml. It will be understood that, by nature, this is not a fixed number for each and every batch of raw goat milk. Raw goat milk can also have a higher count of spores (e.g., up to 2000 spores/ml) or lower (e.g., up to 1000 spores/ml). Raw goat milk generally has a bacteria count of 10,000 to 100,000 bacteria/ml, such as 20,000 to 50,000 bacteria/ml, typically about 30,000 bacteria/ml. The purified goat milk of the invention, particularly as obtainable by the processes described hereinabove, is preferably characterized by comprising at most 500 spores/ml, more preferably at most 250 spores/ml. In the event that a 1 log reduction of spores is obtained with a raw goat milk having 1500 spores/ml, the resulting goat milk will have spores count of 150 spores/ml. A 2 log reduction results in a count of 15 spores/ml. In an interesting embodiment, the purified goat milk described herein comprises at most 150 spores/ml, preferably at most 15 spores/ml. The bacteria count in the purified goat milk is generally at most 10 to 100 bacteria/ml, such as at most 30 bacteria/ml, preferably at most 1 to 10 bacterial/ml, such as at most 3 bacteria/ml, more preferably at most 0.1 to 1 bacteria/ml, such as at most 0.3 bacteria/ml.

It is noteworthy that the aforementioned low spores content is obtained with non-sterilized goat milk. I.e., the goat milk (goat skim milk and goat cream) has not been subjected to heat treatment at or above a level of time and temperature combinations that reflect conditions of sterilization. General sterilization conditions are mentioned above. Particularly, non-sterilized implies that the goat milk has not been subjected to heat treatment at or above 4 seconds at 135° C., or at or above 30 seconds at 125° C.

An additional advantage of the process of the invention, is that a purified goat milk is obtained to which anti-bacterial additives such as lysozyme or other additives known to those skilled in the art, do not need to be added. This opens up a broader range of uses for the obtained goat milk and its components and derivatives.

The purified goat milk of the invention can be put to use in making cheese.

Traditionally, cheese making involves a process wherein milk ingredients are concentrated in order to preserve the ingredients for long periods of time. Many types of cheese exist, each having its own specific production process. Generally, the basic steps in cheese making comprise: providing cheese milk; adding starter cultures; adding a coagulant (rennet type enzymes), coagulation of caseins by proteolytic actions of the coagulant, inducing the milk to form a gel (curd), which becomes separated from a liquid portion (whey); cutting the curd and removing the whey from the curd, thereby concentrating the caseins and the fat; addition of salt; and ripening. In the context of the invention, the cheese milk in these processes is the purified goat milk obtainable by the process disclosed herein. An advantage thereby is that the whey resulting from the cheesemaking process, can be more widely used, viz., also in applications for which the presence of bacteria, spores, and/or additives such as lysozyme, were hitherto limiting. Thus, e.g., the whey can be employed for obtaining whey proteins that can find usage in regulated products such as infant and toddler formula.

The whey as obtained in accordance with the present invention can be concentrated so as to obtain a whey protein concentrate (WPC). This generally has a whey protein concentration of 35-90 WT. %, preferably 60-80 wt. %. In an interesting embodiment the WPC has a concentration of 55% to 65 wt. % of protein calculated on dry matter, such as 60 wt. %.

Alternatively, native whey (and subsequently WPC) can also be obtained from the purified goat milk by conducting a process of separating whey from casein other than by cheesemaking. A suitable process to this end is microfiltration, whereby the whey is obtained as a permeate, and caseins are obtained as a retentate. The applicable microfiltration membranes generally have a pore size in a range of from 0.05 µm to 0.25 µm, preferably 0.1 µm to 0.2 µm, preferably 0.1 µm.

The native whey is also spore free, or at least low in spores; this offers the opportunity to apply less severe heating steps in the following process (to achieve the desired decimal reduction/low number of bacteria). As a consequence, this allows for higher nutritional value of the whey proteins because of less denaturation.

The retentate results in a bacteria- and spores-free stream of casein. Another advantage is that the casein, recombined with the cream, can be transported as a powder, typically spray dried, and put to cheesemaking in parts of the world where suitable volumes of high quality goat milk are not normally available. This moreover obviates the need for bactofugation or sterilization of milk, which is of additional advantage as the intended parts of the world, by lack of milk also generally lack the facilities to conduct such bactofugation or sterilization. A further advantage hereof is that a lower amount of whey proteins ends up as waste. Alternatively, if casein as such is desired as a product this too can be made available as a powder.

As mentioned, the casein stream thus obtained, whether recombined with cream or processed as such, is free from bacteria and spores due to MicroFiltration (1.4 µm) and mild pasteurization of the cream as described before. This allows employing the casein in nutritional products for more vulnerable populations such as the sick and the elderly, for which the customary presence in goat milk of bacteria and spores would be limiting, if not prohibitive. Again, also in these applications an important advantage is that the possibility of a mild heat treatment allows obtaining a product that has a better taste by lack of cooked flavours, and has a better nutritional quality by comprising native rather than denatured proteins.

In carrying out the processes as herein described, equipment can be applied with which the person skilled in the art is well familiar. As discussed above, centrifuges (cream separators). can be open centrifuges, such as provided by GEA-Westfalia, e.g., type MSI-600. Centrifuges can also be hermetically closed, such as provided by TetraPak, e.g., type H75. Microfiltration equipment can, e.g., be based on ceramic membranes (Pall, Tami, Atech), with membrane housing and pumps conventional in the art. The separation and microfiltration processes can be carried out at a range of temperatures, preferably at most 60° C., such as from 10° C. to 60° C., e.g. 50° C. to 55° C. Optionally, in addition to microfiltration, a step of diafiltration can be carried out so as to below further wash out the obtained concentrate.

The invention is hereinafter illustrated with reference to the following, non-limiting, examples.

Example 1

FIG. 1 illustrates an example of an overall process of making purified goat milk, suitable for use as cheese milk, according to the invention. The milk is preheated, as a mild form of pasteurization, at 55° C. and fed into a cream separator. A desired part of the cream thereby obtained is send to a mild cream pasteurization treatment, and is kept in the process. A surplus part of the cream is sent to another cream pasteurizer for separate storage of goat cream. The cream separator is an open centrifuge operated at a flow rate double that of the flow rate by which the raw milk is fed into it. The corresponding additional flow of milk into the separator is provided by a by-pass in a line from the separator to subsequent processing. Via this by-pass the skim milk is recirculated to the cream separator. After having passed through the cream separator twice, the skimmed milk is led to subsequent processing, and is thereby fed into microfiltration unit MF1. This results in spore removal, whereby a spores-free permeate is obtained, and a spores-containing retentate. The retentate is led to UHT/sterilizer treatment. The permeate, the pasteurized part of the cream kept in the process, and the sterilized retentate, are recombined. This results in an output of purified goat milk that can be used as cheese milk, or that can be concentrated for further storage.

Example 2

Figure 2:
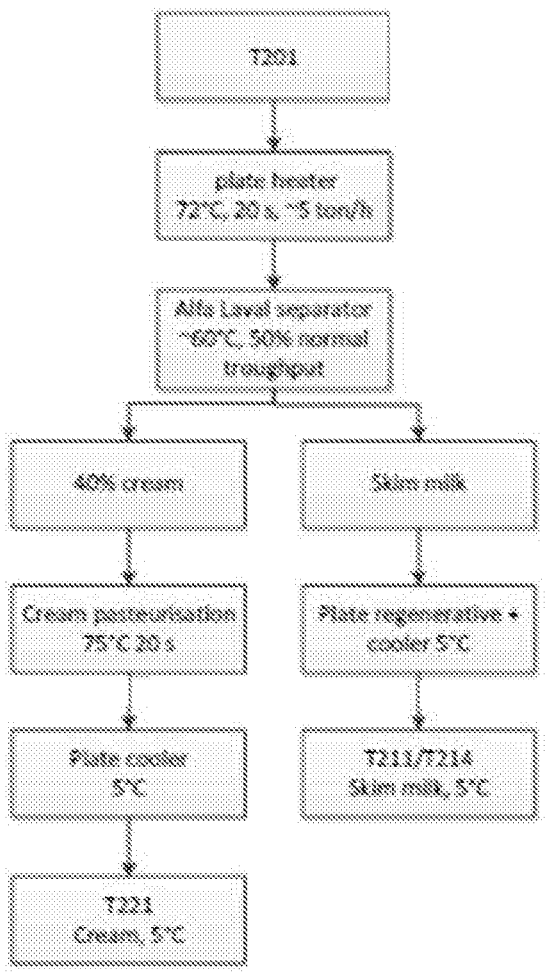
Figure 3:
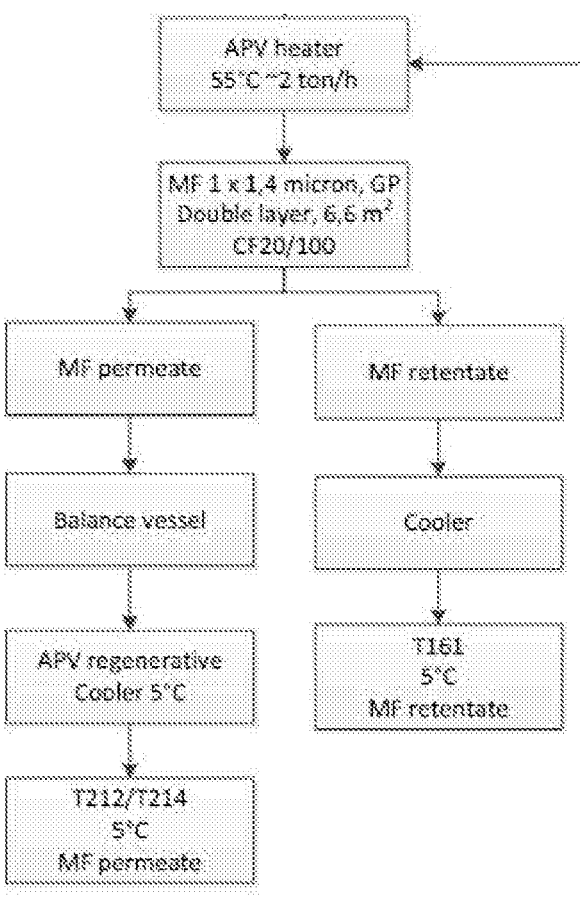

This example follows a scheme depicted in FIGS. 2-4. After reception of the raw goat milk, the milk is mildly pasteurized according to authority regulations and skimmed (FIG. 2). The skimmed milk is thereby fed into a centrifuge at a rate that is halved to allow for more efficient skimming, thus resulting in a lower fat content of the skimmed milk. After the skimming, the milk is subjected to microfiltration (1.4 µm MWCO) to remove bacteria and spores (FIG. 3, the arrow to the APV heater indicating the supply of skimmed milk). Cream is separately sterilized. The MF retentate is combined with the heavy fraction from the cream separation and subjected to sterilization by heat treatment (yielding a sterilized retentate). The resulting MF permeate, i.e. cell-free milk, is recombined with the cream and the sterilized retentate and standardized to the desired fat/protein ratio, resulting in a purified goat milk, suitable for the production of cheese.

Example 3

Purified goat milk obtained by a process as described in Example 1 is subjected to a cheesemaking process. Thereby the milk is pumped into a curd vat, and starter bacteria and calcium chloride are added. Subsequently, when a desired state of acidification has been reached, rennet is added so as to induce coagulation, resulting in curd. The curd is cut into pieces and washed with warm water. The resulting mass of curd and whey is subjected to draining so as to separate the whey from the curd. The curd is transferred to cheese vats, and is thereby pressed into a mould. Pressure is gradually increased, so as to form a well-closing crust, and more whey is released. Finally, the resulting moulded cheeses are salted in brine and subjected to ripening on wooden shelves.

Example 4

FIG. 5 illustrates an example of an overall process of producing whey and casein. As in FIG. 1, raw goat milk is preheated and subjected to cream separation. The cream separation is conducted in a closed centrifuge, whereby the raw milk is fed into the centrifuge at a flow rate of half the capacity of the centrifuge (not shown). Microfiltration MF1 and cream treatment are as in Example 1. The permeate of MF1 is subjected to fractionation, thereby separating casein from whey. The casein is recombined with the pasteurized cream and sterilized MF1 retentate, and can be reconstituted with water so as to obtain cheese milk. The whey is subjected to a further microfiltration (MF2), is concentrated so as to obtain a bacteria and spores-free goat whey concentrate.

Comparative Example

Raw goat milk is obtained, and determined to contain approximately 1000 spores per mL.

A first part of the milk is subjected to decreaming in a GEA-Westfalia MSI-350 cream separator, having a capacity of 34825 L/h, run at full capacity. The goat skim milk thereby obtained is subjected to microfiltration using a 1.2 μm pore size membrane.

The resulting microfiltration permeate has a spores content of approximately 9 spores per mL (99% reduction of the 90% skimmed milk part with 900 spores).

The goat cream is subjected to the same microfiltration, resulting in a goat cream microfiltration permeate having a spores content of approximately 75 spores/mL (25% reduction of the 10% cream part with 100 spores).

The resulting total spores content is thus 84 spores/mL.

A second part of the milk is subjected to decreaming in the same cream separator. Thereby the milk is fed to the separator at a flow rate of 17.500 L/h, thus running the cream separator at about ½ of its capacity. The goat skim milk as well as the goat cream thereby obtained, are subjected to microfiltration as above.

The permeate resulting from the microfiltration of the goat skim milk, has a spores content of approximately 0.9 spores per mL (99.9% reduction of the 90% skimmed milk part with 900 spores). The permeate resulting from the microfiltration of the goat cream, has a spores content of approximately 25 spores per mL (75% reduction of the 10% cream part with 100 spores). The resulting total spores content is thus approximately 25.9 spores/mL.

The invention claimed is:

1. A method of removing spores from raw goat milk, the method comprising subjecting the raw goat milk to decreaming in a cream separator thereby separately removing goat cream and a heavy fraction comprising bacteria and spores, wherein the method comprises feeding the raw goat milk into the cream separator at a flow rate below the full capacity of the cream separator, and operating the cream separator at a flow rate that exceeds the flow rate of raw goat milk as fed to the cream separator by an excess flow rate of 20% to 200%, thereby allowing for a residence time of the raw goat milk in the cream separator exceeding the residence time of milk in the cream separator if operated at full capacity, and obtaining goat skim milk.

2. The method according to claim 1, wherein the excess flow rate is in a range of from 50% to 150%.

3. The method according to claim 1, wherein the cream separator is an open centrifuge, the method comprising operating said cream separator at a flow rate that exceeds the input flow rate of the raw goat milk, thus creating an overflow of centrifuged raw goat milk, whereby the overflow is recirculated to the cream separator.

4. The method according to claim 1, wherein the cream separator is a hermetically closed centrifuge, the method comprising operating said cream separator at a flow rate below its full capacity.

5. The method according to claim 1, comprising subjecting the goat skim milk to microfiltration so as to further remove bacteria and spores, thus obtaining a goat skim milk microfiltrate and a bacteria- and spores-containing microfiltration retentate.

6. The method according to claim 5, wherein the microfiltration is conducted over a membrane having a pore size in a range of 0.8 μm to 1.4 μm.

7. The method according to claim 1, wherein the goat cream is subjected to heat treatment at a temperature of from 65° C. to 115° C.

8. The method according to claim 1, comprising separately storing the microfiltration retentate, and wherein preferably the heavy fraction and the microfiltration retentate are combined at or before storage, the stored materials preferably being subjected to a further decreaming step.

9. A process for the preparation of purified goat milk, the process comprising:
   (a) providing raw goat milk;
   (b) subjecting the raw goat milk to a method of removing spores according to any one of the preceding claims, thereby obtaining goat skim milk and goat cream;
   (c) subjecting the goat cream to mild heat treatment so as to obtain treated goat cream, said mild heat treatment being conducted at a temperature in a range of from 60° C. to 115° C.;
   (d) subjecting the goat skim milk to microfiltration so as to remove bacteria and spores, thus obtaining a goat skim milk microfiltrate and a bacteria- and spores-containing microfiltration retentate;
   (e) optionally concentrating the microfiltration retentate by subjecting said retentate, preferably together with the heavy fraction from the cream separator, to further cream separation and microfiltration, thus obtaining a lower volume of microfiltration retentate
   (f) subjecting the microfiltration retentate of step (d) or (e), optionally together with the heavy fraction from the cream separator, to sterilization so as to obtain a sterilized retentate;
   (g) combining the goat skim milk microfiltrate, the sterilized retentate, and the treated goat cream so as to obtain the purified goat milk.

10. The method according to claim 2, wherein the excess flow rate is in a range of from 75% to 125%.

11. The method according to claim 6, wherein the microfiltration is conducted over a membrane having a pore size in a range of 1.2 μm to 1.4 μm.

12. The method according to claim 7, wherein the goat cream is subjected to heat treatment at a temperature of from 85° C. to 110° C.

13. The method according to claim 1, wherein the goat cream is subjected to heat treatment at a temperature of from 60° C. to 70° C.

14. The method according to claim 13, wherein the goat cream is subjected to heat treatment at a temperature of from 60° C. to 65° C.

15. The method according to claim 8, comprising separately storing the microfiltration retentate at a temperature of 4° C. to 30° C.

\* \* \* \* \*